United States Patent [19]

Roediger

[11] 4,270,279

[45] Jun. 2, 1981

[54] METHOD FOR DRYING AND STERILIZING SEWAGE SLUDGE

[75] Inventor: Hanns E. Roediger, Stuttgart, Fed. Rep. of Germany

[73] Assignee: Techtransfer GmbH, Stuttgart, Fed. Rep. of Germany

[21] Appl. No.: 96,266

[22] Filed: Nov. 21, 1979

[30] Foreign Application Priority Data

Nov. 22, 1978 [DE] Fed. Rep. of Germany ....... 2850607

[51] Int. Cl.$^3$ .......................... F26B 3/00; F26B 7/00
[52] U.S. Cl. ............................................ 34/9; 34/12; 210/609
[58] Field of Search .................. 34/9, 12; 159/1 RW; 210/735 G, 609; 106/118

[56] References Cited

U.S. PATENT DOCUMENTS

| | | | |
|---|---|---|---|
| 2,723,954 | 11/1955 | Young | 34/9 |
| 3,793,841 | 2/1974 | Dozsa | 106/118 |

FOREIGN PATENT DOCUMENTS 835216  5/1960  United Kingdom ............... 159/1 RW Primary Examiner—John J. Camby
Attorney, Agent, or Firm—Sughrue, Rothwell, Mion, Zinn and Macpeak

[57] ABSTRACT

An inexpensive method for drying and sterilizing sewage sludge that has previously gone through a preliminary drying process and has, on the average, a solid matter content ranging between 15 and 35% and a maximum content of 40%. The sewage sludge is dried and sterilized by breaking it into ball-like particles having diameters ranging from 1 to 10 mm and coating these particles with quicklime. The entire process can be performed using a paddle mixture. The quicklime not only reacts with the surfaces of the particles so coated but also penetrates into their interiors. The resulting chemical reaction ($H_2O + CaO \ T \ Ca(OH)_2$) dries and sterilizes the sludge, without the necessity of applying heat from an external source, directly to produce a granular product which, for example, can be used as an agricultural fertilizer which can be scattered by a conventional fertilizer spreader.

6 Claims, No Drawings

METHOD FOR DRYING AND STERILIZING SEWAGE SLUDGE

BACKGROUND OF THE INVENTION

The invention relates to a method for the further drying and sterilization of partially dewatered sheet-like sewage sludge having a solid matter content of preferably 15 to 35%.

Various methods are known in connection with sewage sludge according to which the sludge is spread onto an endless sieve belt and successively lead through, for example, a first drainage zone for draining the free standing water, a second draining zone with continuously increasing compression, a further drying zone, and a "milling" zone in which additional water is removed from the sludge cake by shearing forces (German PS No. 2,351,097, German AS No. 2,522,505). After passing through the various drainage zones the sludge cake has a solid matter content of an average of 15 to 35% and a maximum of 40%. The sewage sludge drained according to this process no longer resembles a paste, but rather a plurality of sheets or small clumps, but is still incapable of being scattered as a crumbly or granular material. Furthermore, in many cases sterilization of the drained sludge is necessary.

To decrease water content, thus increasing solid matter content, and to simultaneously sterilize it, it has been proposed to mill or mix quicklime with the sewage sludge containing preferably from 15 to 35% solid matter.

This type of milling or mixing is in the opinion of persons skilled in the art necessary so that the entire sludge material—including the inner portions—can react chemically with the quicklime. To perform the milling, for example, a plough share (twin screw) mixer or a double wave mixer can be used. Although this procedure does result in a further decrease of liquid content, the mixing or kneading of lime and sewage sludge is quite expensive, because the necessary apparatus is very expensive. This type of mixing has the further disadvantage that the sewage sludge to be removed from the apparatus is in the form of a paste so that further expensive method steps (among others intermediate storage for several days) are necessary to make the product scatterable.

SUMMARY OF THE INVENTION

It is therefore the object of the present invention to provide a method of the above-described type, by which additional drainage and sterilization of the sewage sludge can take place and a direct use of the sludge as a scatterable material is also possible, while using simple, inexpensive apparatus.

This object is attained according to the invention in that the sheet-like sewage sludge is broken up and sprinkled (i.e., dusted) with quicklime. In contrast to the prior art, accordingly, the sewage sludge does not need to the mixed with the lime. To the contrary, all that is necessary is that the sludge be broken up and sprinkled or dusted with quicklime, for example by treatment in a simple paddle mixer. The breaking up action preferably yields ball-like sludge particles having diameters of from 1 to 10 mm.

In this rough mixing with lime, only the outer surface is "sprinkled", but it has surprisingly been shown that the lime reacts not only with the surface of the sludge particles, but also penetrates completely into them. The resulting chemical reaction between the quicklime and water ($H_2O + CaO \rightarrow Ca(OH)_2$) results in further removal of water and sterilization.

The additional water removal takes place because of the following factors:

(a) the addition of solid matter in the form of quicklime, (b) chemical bonding of sludge water by transformation of quicklime into slaked lime, and (c) evaporation of further sludge water by the heat resulting from the chemical reaction.

The sterilization is achieved:

(1) by complete alkalization into the center of the sludge particles, and (2) by the heat resulting from the chemical reaction.

According to the process of the invention, it has surprisingly been shown that in comparison to the relevant prior art the quicklime need only be sprinkled over the broken up sludge. This sprinkling (powdering) can preferably be accomplished in an economical paddle mixer. In order to achieve a heating of the bulk matter to about 70° to 80° C. and an alkalization throughout the interior of the sludge particles to a pH range of 11 to 12, 150 gm to 600 gm of CaO, preferably from 200 gm to 400 gm CaO, are added per kg of dry sludge matter i.e., of the solid content of the sludge.

In order to achieve complete sterilization, the waste water sludge treated with the quicklime need only be stored for about 4 hours. In storing the bulk matter, which because of the treatment according to the invention has become quite porous, thus allowing good access to air, the $CO_2$ in the air also reacts with the lime (carbonate formation), so that the outer surfaces of the particles in the bulk matter become rigidified and can no longer cake together. This results in a granular, scatterable product which can be utilized directly, for example, as fertilizer in agriculture (even with plate spreaders).

The process according to the invention thus for the first time makes it possible to produce scatterable sewage sludge directly after its treatment with quicklime, i.e., without any other processing steps. The invention also creates the possibility of adjusting the dry matter content of the treated sludge as well as the degree of sterilization caused by heating by selective addition of certain quantities of quicklime.

What is claimed is:

1. A method of sterilizing and further dehydrating a sheet of partially dehydrated sewage sludge having a solid matter content in the range of 15 to 35%, said method comprising only the steps of breaking up the sludge sheet into particles and then dusting only the surfaces of the particles with quicklime to form a granular fertilizer product which can be scattered by conventional fertilizer spreader, said method being carried out without any external heating.

2. The method according to claim 1 wherein the dusting step takes place in a paddle mixer.

3. The method according to claim 1 wherein said dusting step comprises applying 150 gm to 600 gm of quicklime per kg of the solid matter content of the sludge.

4. The method according to claim 2 wherein said dusting step comprises applying 150 gm to 600 gm of quicklime per kg of the solid matter content of the sludge.

5. The method according to claim 3 wherein the quicklime is added at the rate of 200 gm per kg of solid matter content of the sludge.

6. The method according to claim 1, 2, 3, 4 or 5 further comprising the step of storing the dusted sludge in air for about four hours so that the ambient carbon dioxide reacts with the quicklime to form calcium carbonate so that the surfaces of the sludge particles become hard.

* * * * *